(12) United States Patent
Faher

(10) Patent No.: US 6,260,278 B1
(45) Date of Patent: Jul. 17, 2001

(54) HAND-HELD LAWN AND BRUSH TRIMMER HAVING MANUAL TRIMMER HEAD ADJUSTMENT MECHANISMS

(76) Inventor: Andy R. Faher, 59408 Klumbis, Dowagiac, MI (US) 49047

( * ) Notice: Subject to any disclaimer, the term of this patent is extended or adjusted under 35 U.S.C. 154(b) by 0 days.

(21) Appl. No.: 09/327,449

(22) Filed: Jun. 8, 1999

(51) Int. Cl.[7] .................. B26B 27/00; A01D 34/835; A01D 34/82
(52) U.S. Cl. ................... 30/276; 30/347; 172/41
(58) Field of Search .......... 30/276, 347, 272.1; 172/13, 14, 41, 96, 94, 110, 111; 74/840, 20, 22 R, 99 R, 527, 523

(56) References Cited

U.S. PATENT DOCUMENTS

| | | | |
|---|---|---|---|
| 2,608,043 | * | 8/1952 | Berdan .................. 30/DIG. 5 |
| 4,848,746 | * | 7/1989 | Yamada et al. ............ 30/276 |
| 4,924,573 | * | 5/1990 | Huddleston et al. ........ 30/276 X |
| 5,558,057 | * | 9/1996 | Everts .................... 30/276 X |
| 5,651,418 | * | 7/1997 | Jerez ..................... 172/14 |

* cited by examiner

Primary Examiner—Boyer Ashley
(74) Attorney, Agent, or Firm—R. Tracy Crump

(57) ABSTRACT

A portable lawn and brush trimmer including an elongated tubular boom arm, motor assembly mounted at one end of the boom, a trimmer head mounted on the opposite ends of the boom arm, and two adjustment mechanisms, which allow the attitude of the trimmer head to be adjusted about two different axis in relation to the boom arm is disclosed. The adjustment mechanisms allow an operator to manually change the attitude and orientation of the trimmer's cutting plane to conform to the slope and contour of the terrain without the operator altering the natural balanced operating position of the trimmer or his body posture while maintaining the natural balanced orientation of the boom arm with respect to the operator and not the terrain being worked. One adjustment mechanism (pivot adjustment) allows the trimmer head to pivot in relationship to the boom arm between a number of manually selectable angular positions. Another adjustment mechanism (swivel adjustment) allows the trimmer head to swivel 360° about the longitudinal axis of the trimmer head's neck and lock into one of several fixed positions.

12 Claims, 10 Drawing Sheets

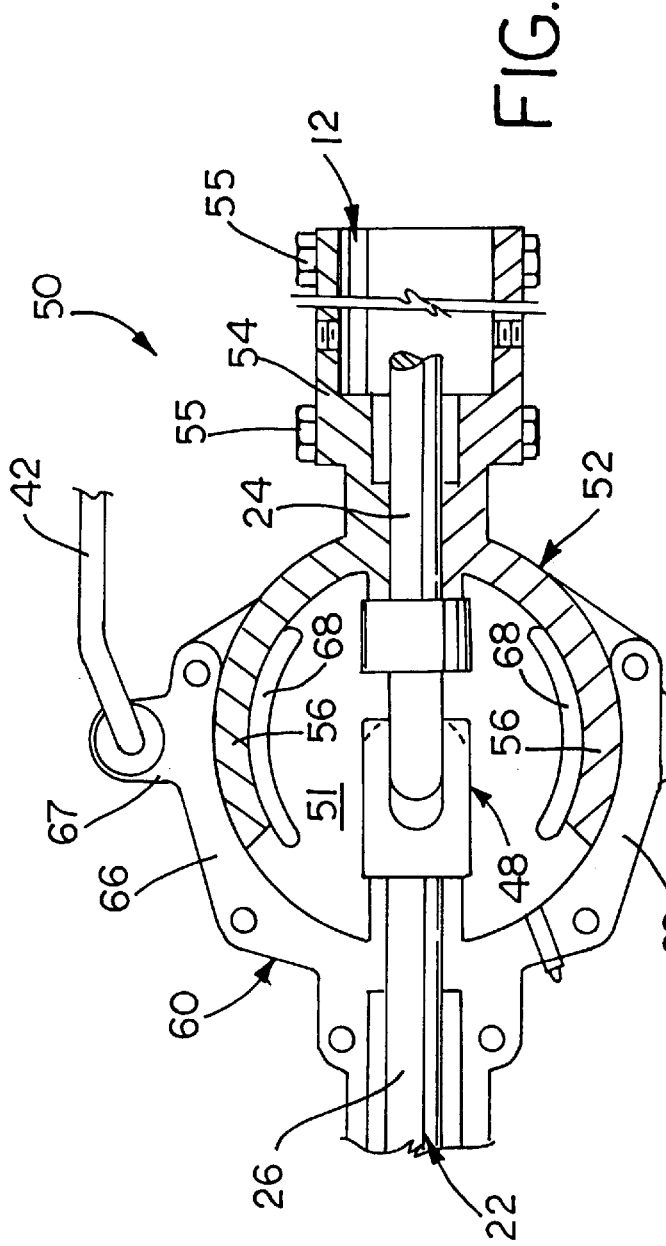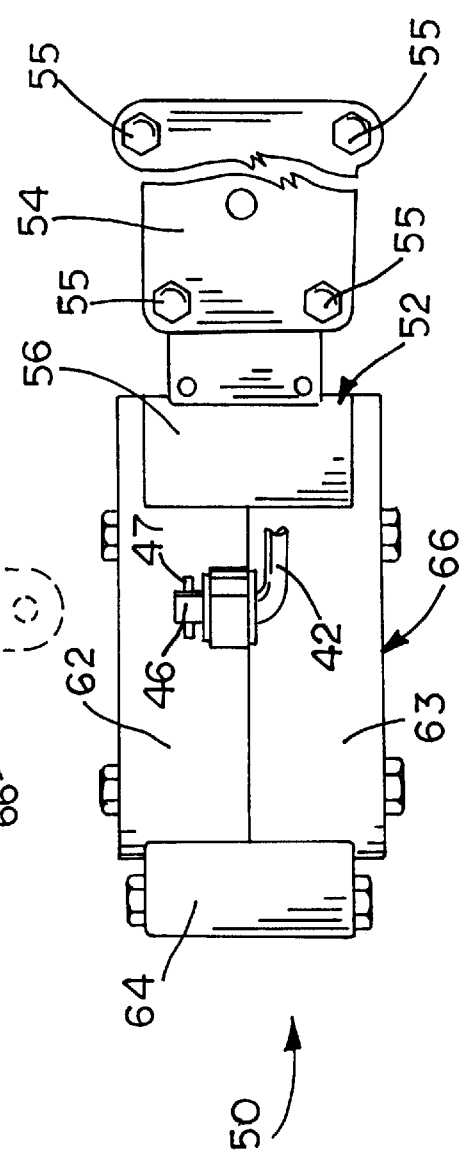

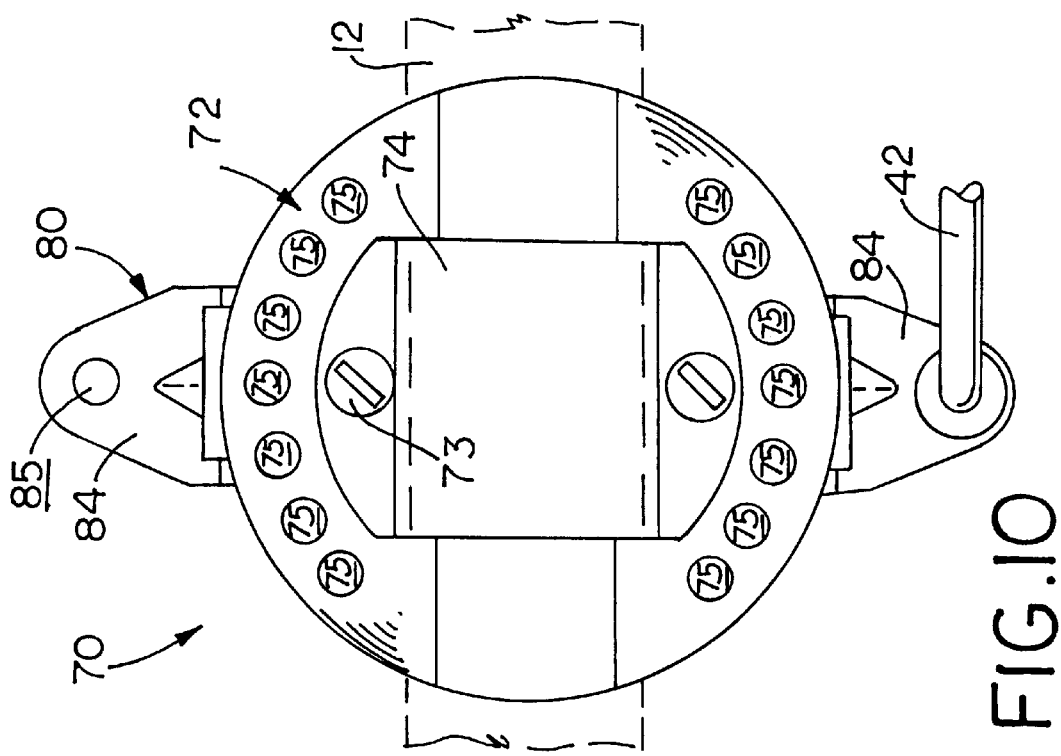
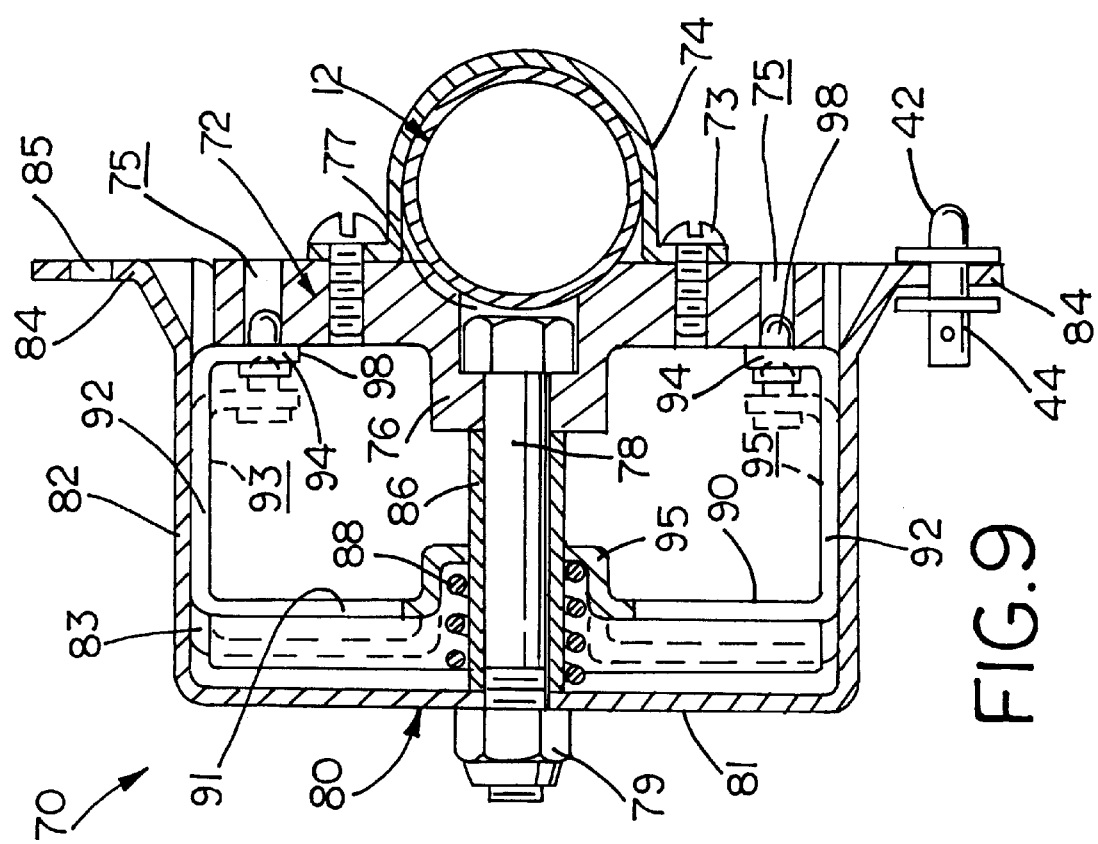

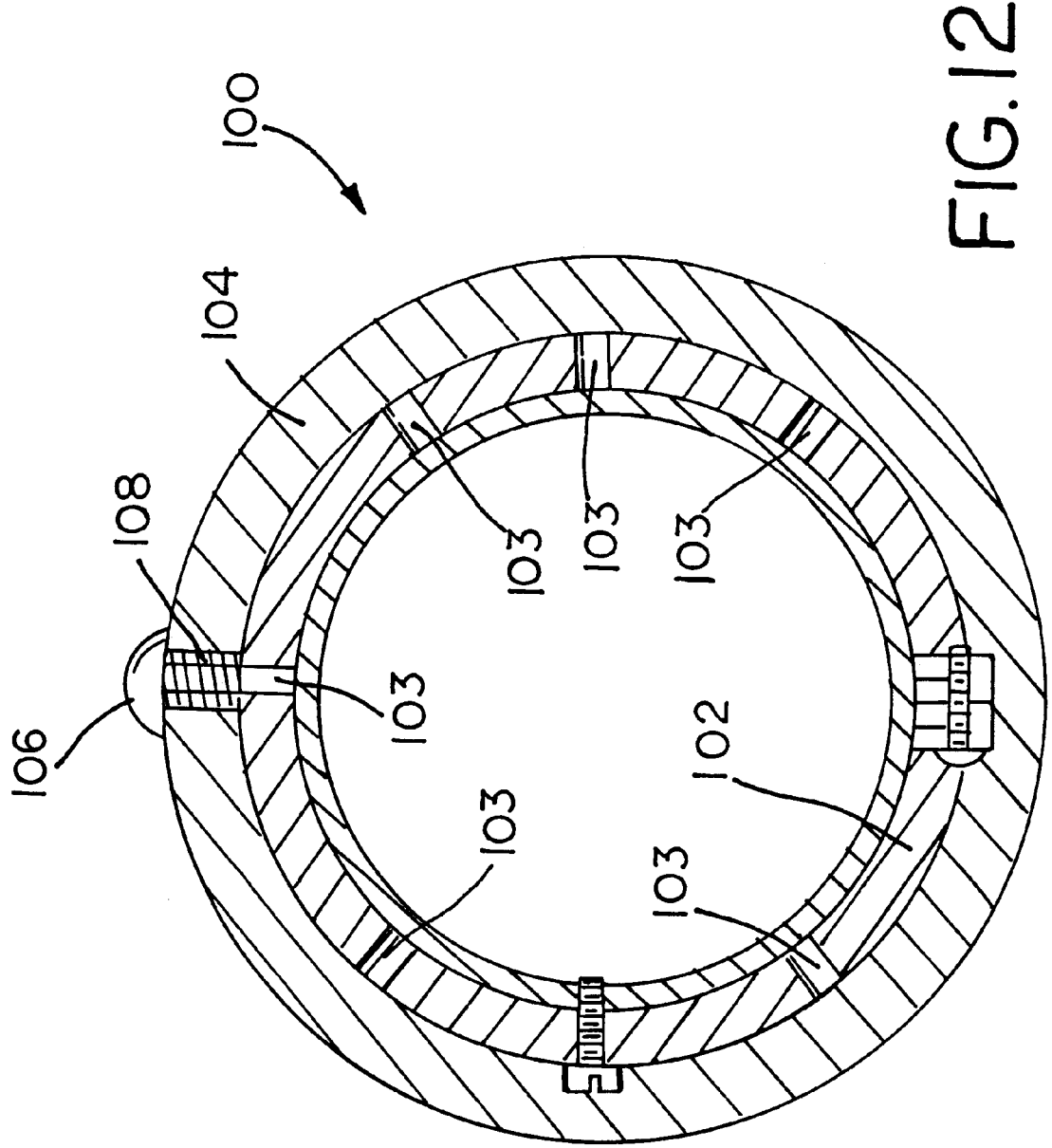

HAND-HELD LAWN AND BRUSH TRIMMER HAVING MANUAL TRIMMER HEAD ADJUSTMENT MECHANISMS

This invention relates to hand-held lawn and brush trimmers and in particular a lawn and brush trimmer that includes mechanical adjustments for selectively changing the attitude and orientation of the cutting plane of the trimmer head in relation to the trimmer's boom arm.

BACKGROUND OF THE INVENTION

Hand-held trimmers for cutting grass, brush and weeds are well known. Most hand held trimmers include a type of portable motor, a trimmer head having a rotating cutting component, such as a nylon cord or metal and plastic blades and a long boom arm. The trimmer head is connected at an angle to the distal end of the boom arm. In operation, a user typically grasps the boom arm or a handle part mounted to the boom at approximately the user's waist height and directs the rotating cutting component of the trimmer head at the distal end of the boom arm over the terrain. The length and angular orientation of the boom arm allows the operator to work the trimmer head directly over the terrain surface in a natural upright stance and without bending over. The angular orientation of the trimmer head with respect to the boom arm also positions the cutting plane of the rotating cutting component to be parallel to level terrain.

Many trimmer designs have been developed. Some trimmer designs incorporate the drive motor directly into the trimmer head, however, trimmers of this design are more difficult to manipulate and fatiguing to the operator because most of the trimmer's weight is located at one end of the boom arm. Consequently, most conventional trimmer designs locate the drive motors at opposite ends of the boom arms to provide more balanced and ergonomic operation. Since the motor and trimmer head are located at opposite ends of the boom arm, a drive shaft is rotatably disposed in the boom arm to transfer the rotational motion from the motor to the cutting component in the trimmer head.

Heretofore, lawn and brush trimmers that use a drive motor and trimmer head located at opposite ends of a boom arm have cutting planes that are fixed at permanent angular orientation with respect to the longitudinal axis of the boom arm. The angular orientation between the cutting plane and the boom arm is fixed due to the mechanical constraints of the drive shaft, which extends through the boom arm and connects the motor to the cutting components. The fixed angular orientation between the cutting plane and the boom arm make trimming difficult for persons of other than about average height. In addition, the fixed angular relationship can also make the trimmer difficult to use on uneven and sloping terrain. Consequently, in operation over un-level sloped terrain, an operator must hold and manipulate the trimmer to alter the natural balanced orientation of the boom arm in order to achieve a cutting plane parallel to the un-level sloped terrain. On upward sloping terrain, an operator must hold and manipulate the trimmer so that the trimmer head is raised and the boom arm is more parallel. On a downward sloping terrain, the operator must manipulate the trimmer so that the trimmer head is closer to the operator's feet and the boom arm is lowered at a more acute angle and the trimmer head is closer to the operators feet. Manipulating the trimmer outside of its natural balanced operating orientation makes the operation of the trimmer more fatiguing to the operator and may lead to unsafe use of the trimmer. Some lawn and brush trimmers have been developed that have boom arms that are adjustably connected to the trimmer heads, but these trimmers all locate the drive motor and trimmer heads at the distal end of the boom arms, which again creates an unbalanced tool for operation. Consequently, a balanced lawn and brush trimmer including an adjustment, which allows the attitude and orientation of the cutting plane of the trimmer head without changing the angular orientation of the boom arm from its normal balanced position is desirable.

SUMMARY OF THE INVENTION

The invention in one form thereof, provides a lawn and brush trimmer including a motor assembly and trimmer head mounted on opposite ends of a tubular boom arm and two manual adjustment mechanisms, which allow the attitude and orientation of the trimmer head to be adjusted with respect to the boom arm. The two adjustment mechanisms allow the trimmer head to pivot and rotate about two different axis in relation to the boom arm between several discrete adjustment positions. The adjustment mechanisms allow an operator to manually change the attitude and orientation of the trimmer's cutting plane to conform to the slope and contour of the terrain without the operator altering the natural balanced operating position of the trimmer or his body posture and while maintaining the natural balanced orientation of the boom arm with respect to the operator and not the terrain being worked. One adjustment mechanism (the pivot adjustment) allows the trimmer head to pivot in relationship to the boom arm between a number of manually selectable angular positions. Another adjustment mechanism (the swivel adjustment) allows the trimmer head to swivel 360° about the longitudinal axis of the trimmer head's neck and lock into one of several fixed positions. Both adjustment mechanisms work independently thereby providing different combinations of angular adjustments for the trimmer head about two separate axis of rotation while allowing the drive shaft to transfer rotational movement from the motor to the cutting components of the trimmer head. The invention in one form incorporates the adjustment mechanisms directly into the design of a hand-held lawn and brush trimmer, but in alternative forms, the adjustments can be incorporated as a modification to conventional trimmers.

The trimmer head pivot adjustment is connected to the trimmer's boom arm and includes a pivot selection assembly and a pivot joint assembly connected by a long rod. The joint assembly includes an upper housing part connected to the boom arm and a lower housing part connected to the trimmer head. The upper and lower housing parts form an enclosed cylindrical inner chamber for enclosing an universal joint. The pivot assembly divides the trimmer's drive shaft into two segments, connected by the universal joint. The upper housing part is shiftably disposed within the lower housing part for pivotal movement about a lateral axis. The selector assembly includes a disc shaped selector plate, a mounting clamp, a rotatable C-shaped selector handle, a coil spring and a C-shaped release lever. When the release lever is depressed, the handle can be rotated between seven discrete trimmer head positions. Rotating the handle moves the rod, which pivots the lower joint housing about the upper joint housing lifting or lowering the trimmer head in relation to the boom arm. When the lever is released, a spring forces the lever against the inner surface of the selector plate and seats two detents in one pair of several opposed bores in the selector plate, which locks the trimmer head in one of several discrete positions.

The trimmer head swivel assembly includes an inner collar part connected to the joint housing, an outer collar connected to the neck of the trimmer head and a spring tensioned release button. The inner collar is retained within the outer collar for rotatable concentric movement about its longitudinal axis. The inner collar can be secured in one of eight discrete positions by the lock button that extends into one of several radial bores formed in the inner collar. The lock button can be manually withdrawn from a bore to allow the inner collar to rotate within the outer collar. When manually released, a tension spring forces the lock button into another bore to lock the trimmer head in a set position.

Accordingly, an advantage of this invention is that the lawn and brush trimmer can be quickly and readily adjusted by a user for operation on terrains of different slopes and contours.

Another advantage of this invention is that the trimmer head can be pivoted and rotated about two axis for angular adjustment between several manually selected positions.

Another advantage of this invention is that the adjustment mechanisms do not substantially alter the weight or balance of the trimmer.

Another advantage of this invention is that the user can operate the trimmer over terrain of different slopes and contours without altering or manipulating the balanced angular orientation of the trimmer's boom arm.

Another advantage of this invention is that the adjustment mechanisms can be incorporated into the design of a lawn and brush trimmer or adapted as a modification for conventional lawn and brush trimmers.

Other advantages will become apparent upon a reading of the following description.

BRIEF DESCRIPTION OF THE DRAWINGS

A preferred embodiment of the invention has been depicted for illustrative purposes only wherein:

FIG. 7 is a side sectional view of the pivot joint assembly;

FIG. 8 is a top view of the pivot joint assembly;

FIG. 9 is a cross sectional view of the pivot adjustment selection assembly;

FIG. 10 is a side view of the pivot adjustment selection assembly;

FIG. 12 is a cross sectional view of the adjustable head roation assembly.

DESCRIPTION OF THE PREFERRED EMBODIMENT

The preferred embodiment herein described is not intended to be exhaustive or to limit the invention to the precise form disclosed. It is chosen and described to best explain the invention so that others skilled in the art might utilize its teachings.

Figure 1:
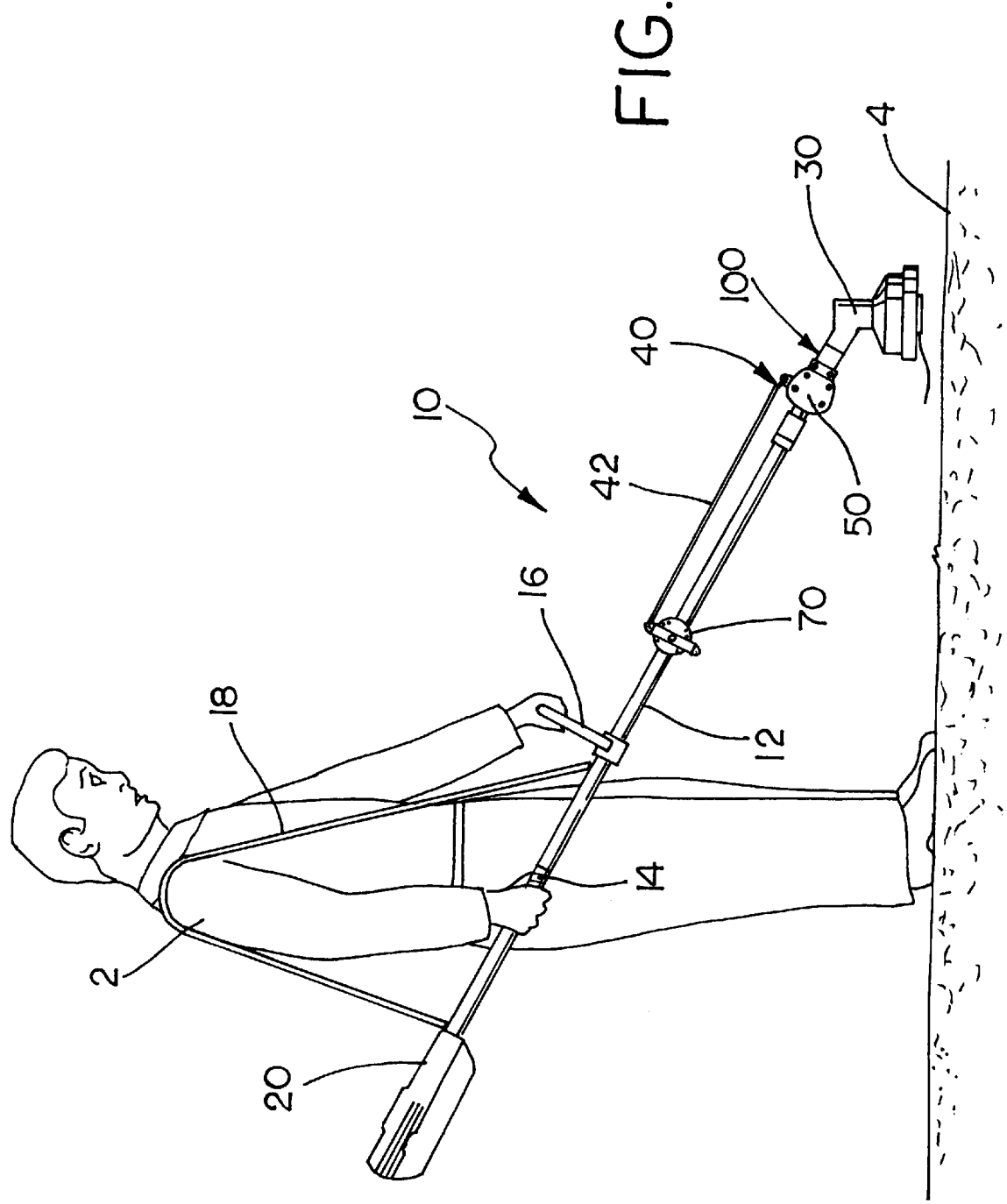
FIG. 1 is a perspective view of an user operating a lawn trimmer using the improvement of this invention on level ground.

Referring to the figures, reference numeral 10 indicates the hand-held lawn and brush trimmer embodying this invention. Trimmer 10 is used for trimming grass, brush, weeds and the like from a variety of terrain. As shown in the figures, trimmer 10 generally includes a tubular boom arm 12, a motor assembly 20 and a trimmer head 30 mounted at opposite ends of the boom arm. Trimmer 10 also incorporates the two mechanical adjustment mechanisms, trimmer head pivot adjustment 40 and trimmer head swivel adjustment 100, which are the subject matter of this invention. The placement of the motor assembly 20 and trimmer head 30 at opposite ends of boom arm 12 allows trimmer 10 to be equally balanced for ergonomic operation. As best shown in FIG. 1, in the proper balanced operating position, boom arm 12 is positioned at an angular orientation to level ground. Trimmer head pivot assembly 40 and trimmer head swivel assembly 100 allows trimmer head 30 to pivot and rotate about two separate axis to orientate the trimmer's cutting plane to the contour of various terrain. The adjustable head pivot and adjustable head swivel mechanisms may also be used as attachment components for modifying any conventional lawn and brush trimmer, as illustrated herein, but may be incorporated directly into the design and construction of a trimmer.

Basic Trimmer Design

Motor assembly 20 is mounted to the proximal end of boom arm 12 and includes a conventional portable motor (not shown) enclosed in a protective outer housing. The engine is of the type suited for use in portable lawn and brush trimmers and may be gas or electric powered. A drive shaft 22 extends through boom arm 12 for transmitting rotation power from the motor to trimmer head 30. Trimmer head 30 includes an angled tubular neck 32, rotating cutting components 34, and a safety guard 36, which covers the cutting components. The rotating cutting component 34 is typically a length of nylon cord (as illustrated in the figures) or a set of metal or plastic blades. Neck 32 connects trimmer head unit 30 to the distal end of boom arm 12. The distal end of drive shaft 22 extends into neck 32 and is coupled to a bevel gear (not shown) that transfers the rotational movement of drive shaft 22 to cutting components 34, such that the plane of the cutting components 24 is at a fixed angular orientation to the longitudinal axis of neck 32. A boom grip 14 and handle 16 are mounted to boom arm 12, which allows the operator to grasp trimmer 10. A control switch (not shown) is wired to the motor and positioned on or near either boom grip 14 or handle 16 for ready access by an operator. A shoulder strap 18 is connected to trimmer 10, which allows the operator's shoulders to bear the weight of trimmer 10, while his arms and hands are used simply to guide the operation of trimmer 10 over the ground.

Trimmer Head Pivot Adjustment

Trimmer head pivot adjustment 40 allows trimmer head 30 to pivot in relationship to boom arm 12 between a number of discrete angular positions while rotary motion from the motor is transmitted to the cutting components of the trimmer head. Trimmer head pivot adjustment 40 includes a pivot joint assembly 50 and a pivot selection assembly 70, which are connected by an elongated metal rod 42. Each end of Rod 42 is bent to form a foot 44 and 46. Pivot joint assembly 50 connects the distal end of boom arm 12 to neck 32 of trimmer head 30 and enables the trimmer head to pivot about an axis perpendicular to the longitudinal axis of the boom arm while rotational motion is still transferred to the trimmer head. Pivot selector assembly 70 is mounted to boom arm 12 approximately midway between handle 16 and pivot joint assembly 50 and enables trimmer head 30 to be positioned and locked in several discrete angular positions.

Joint assembly 50 includes an upper housing part 52 and a lower housing part 60, which form an enclosed cylindrical inner chamber 51 for enclosing an universal joint 48. As shown, trimmer head pivot adjustment 40 divides drive shaft 22 into two segments, upper segment 24 and lower segment 26 connected by universal joint 48. Upper drive shaft segment 24 extends through boom arm 12 from motor assembly 20 to universal joint 48. Lower drive shaft segment 26 extends from universal joint 48 through trimmer head neck 32 to the bevel gear. Universal joint 48 allows the rotary motion from motor assembly 20 to be transferred to trimmer head 30 while upper and lower drive shaft segments 24, 26 are at different angular orientations. Upper housing 52 has a tubular neck part 54, which is connected to boom arm 12 and upper drive shaft segment 24. Boom arm 12 is secured to upper neck part 54 by fasteners 55. Upper housing 52 has a generally cylindrical cross section formed by two arcuate end walls 56. Lower housing 60 is comprised of two halves 62, 63. Lower housing 60 also has a generally cylindrical cross section formed by two arcuate end walls 66. Lower housing 60 also forms a tubular neck part 64, which is connected to trimmer head swivel adjustment 100 as illustrated in the figures or directly to trimmer head 30 alternatively. Each half 62, 63 has two arcuate retaining ribs 68 extending from their side wall. As shown in FIGS. 7 and 8, upper housing 52 is shiftably interposed between halves 62, 63 of lower housing 60, such that upper housing end walls 56 are shiftably positioned between the inner surface of outer housing end walls 66 and retaining ribs 68. The shiftable engagement of upper end walls 56 between lower housing end walls 66 and retaining ribs 68 allows the upper housing 52 to pivot inside lower housing 60. One half 62 of lower housing 60 includes an eyelet 67 for receiving foot 46 of connecting rod 42. Foot 46 extends through eyelet 67 and is secured by fasteners 47, such as a cotter key.

Selector assembly 70 includes a disc shaped selector plate 72, mounting clamp 74, rotatable C-shaped selector handle 80, a coil spring 88 and a C-shaped release lever 90. Selector plate 72 is constructed of a metal or other suitably sturdy material. Selector plate 72 is mounted to the side of boom arm 12 between handle 16 and joint assembly 50, such that the flat face of the disc abuts the boom arm so that the plane of selector plate 72 is parallel to the longitudinal axis of the boom arm. Selector plate 72 is secured to the side of boom arm 12 by bracket 74 and fasteners 73, which extend through bores in bracket 74 and turn into threaded bores in selector plate 72. Selector plate 72 has two sets of seven adjustment bores 75, which provide seven discrete handle adjustment positions. As shown, each set of adjustment bores 75 is formed adjacent the periphery of the plate and aligned in an arc. Selector plate 72 has a central boss 76 protruding perpendicularly from its inner face. The outer face of selector plate 72 has a recessed through bore 77, which passes through boss 76 for receiving a bolt 78. As shown, bolt 78 extends through bore 77 and through a tubular metal spacing sleeve 86 with the head of bolt 78 disposed within the recessed cavity of bore 77 adjacent boom arm 12.

As shown, selector handle 80 is a bent band of flat metal. Selector handle 80 is bent in a C-shaped configuration to include a back part 81 substantially parallel to the plane of selector plate 72, and two parallel leg parts 82, which terminate in to outwardly protruding end flanges 84. While selector handle 80 is illustrated herein as being constructed of a bent metal band, the handle may be constructed of any suitable material or design without altering the teaching of this invention. Selector handle 80 is connected to selector plate 72 so that the selector handle rotates diametrical with respect to the face of selector plate 72. Selector handle 80 is seated on sleeve 86 and connected by bolt 78, which extends through a central bore formed in back part 81 and is secured by a nut 79. Each handle leg 82 has a longitudinal protruding rib 83 from its inner surface. Handle end flanges 84 have bores 85 for receiving foot 44 of connecting rod 42. Foot 46 extends through eyelet 67 and is secured by a fasteners such as a cotter key (not shown).

Release lever 90 is also a bent band of flat metal. Release lever 90 is bent in a C-shaped configuration conforming to the inner contour of selector handle 80 and includes a back part 91, and two parallel leg parts 92, which terminate in to inwardly protruding end feet 94. Each lever leg part 92 has a longitudinal groove or slot 93 formed therein for shiftably receiving rib 83 of handle leg part 82. Release lever 90 is seated over sleeve 86, which extends through a central through bore formed in lever back part 91. Coil spring 88 is seated over bolt 78 between selector handle 80 and release lever 90. Lever back part 91 has a centrally located joggle 95, which forms a seat for one end of spring 88. Lever end feet 94 include a detent or button 98, which protrudes outward toward selector plate 72. As shown, each set of adjustment bores is positioned on selector plate 72 so that buttons 98 are aligned with and are extensible into opposed bores in each set. As shown the outer face of each lever leg part 92 shiftably abuts against the inner face of handle leg part 82 with rib 83 seated within groove 93. The shiftable engagement of ribs 83 within grooves 93 retains release lever 90 in linear orientation with selector handle 80. Coil spring 88 biases release lever 90 against the inner surface of selector plate 72 and urges buttons 98 into opposed adjustment bores 75.

Trimmer head pivot adjustment 40 allows trimmer head 30 to pivot in relationship to boom arm 12 between a number of discrete angular positions while rotary motion from motor assembly 20 is transmitted to cutting components 34 of trimmer head 30. Pulling release lever 90 outward against selector handle 80 compresses spring 88 and removes buttons 98 from adjustment bores 75 allowing the selector handle to be rotated about bolt 78. Each of the opposed adjustment bores 75 in selector plate 72 provides a discrete angular position of trimmer head 30. In each position, buttons 98 are seated in opposed adjustment holes on opposites sides of selector plate 72. When release lever 90 is manually pressed against selector handle 80, buttons 98 are withdrawn from adjustment bores 75 and selector handle 80 can be manually rotated between seven discrete positions across an angular range of approximately 100°. Rotating selector handle 80 moves connecting rod 42, which pivots lower joint housing 60 about upper joint housing 52 lifting or lowering trimmer head 30 in relation to boom arm 12. When release lever 90 is released, coil spring 88 forces release lever 90 against the inner surface of selector plate * to seat buttons 98 into two opposed adjustment bores 75, thereby locking the trimmer head in one of seven selectable positions.

Trimmer Head Swivel Adjustment

Trimmer head swivel adjustment 100 allows trimmer head 30 unit to rotate axially 360° about the longitudinal axis of neck 32 and to be locked into several discrete rotation positions. As shown in FIGS. 5, 6, 11 and 12, trimmer head swivel adjustment 100 includes an inner collar part 102 formed in neck part 64 of lower joint housing 60, and outer collar 104 formed in trimmer head neck 32 and a spring tensioned release button 106. Inner collar part 102 has a plurality of radial holes 103 (eight holes are shown in FIG. 12). Outer collar part 104 has a single radial bore for receiving release button 106 and a coil spring 108. Inner collar 102 is retained within outer collar 104 for rotatable concentric movement about its longitudinal axis. Inner collar 102 can be secured in one of eight discrete selectable positions with button 106 extending into each of bore 103. Button 106 can be depressed manually into bore 103 to allow inner collar 102 to rotate to another position. When released, button 106 is urged into a bore 103 to lock trimmer head 30 in a set position in relation to the longitudinal axis of neck 32.

Trimmer Operation

Figure 2:
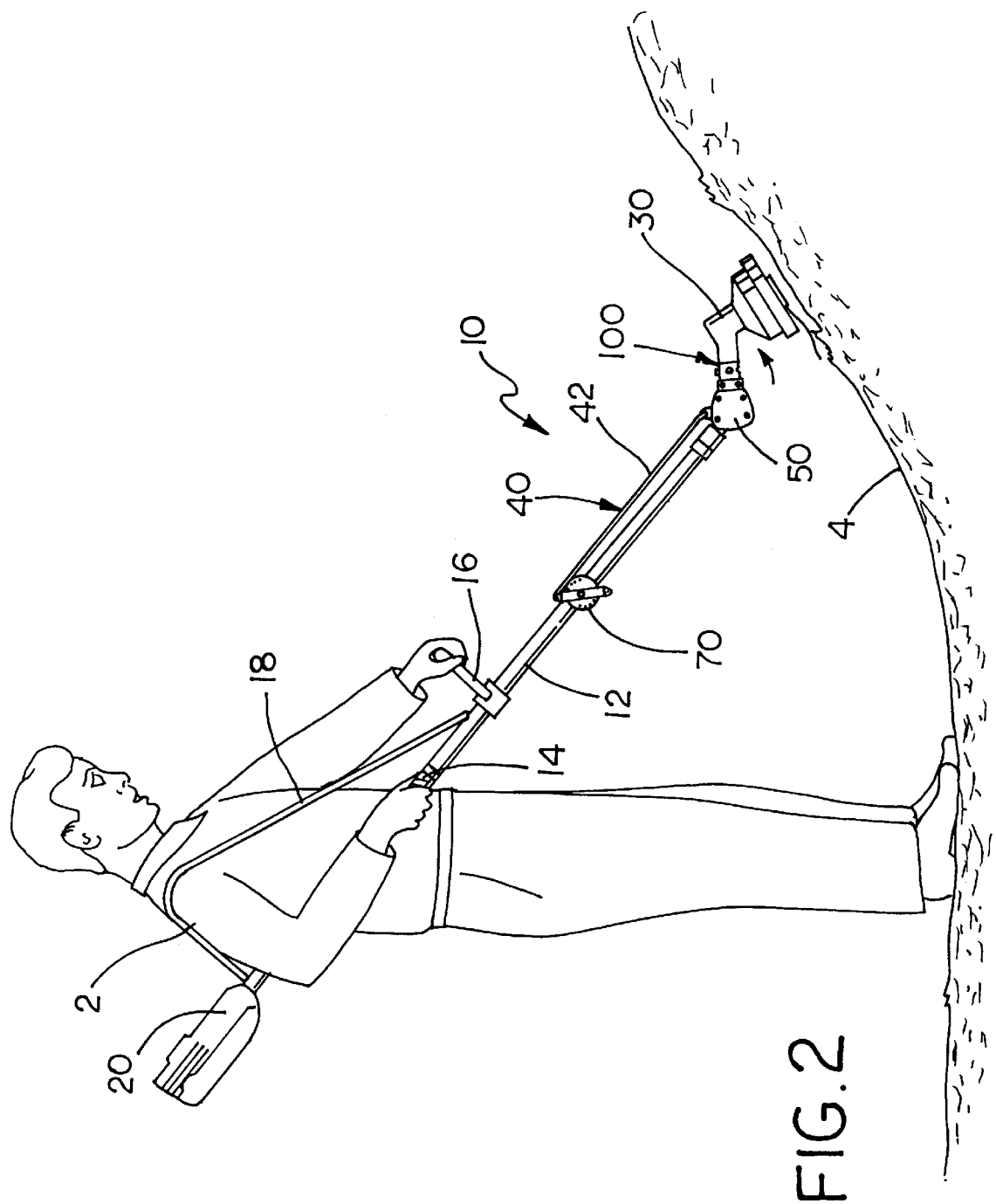
FIG. 2 is a perspective view of an user operating a lawn trimmer using the improvement of this invention on the upward sloping ground of a ravine.
Figure 3:
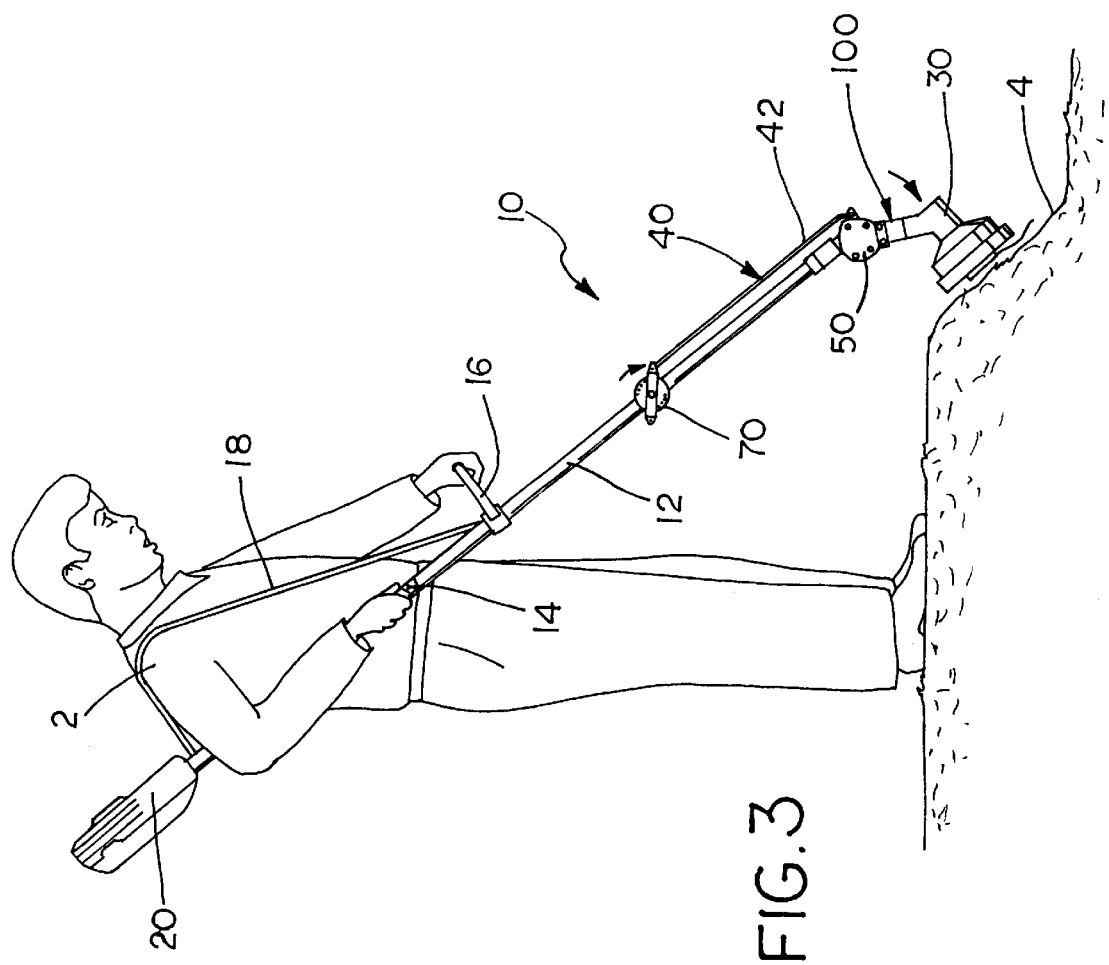
FIG. 3 is a perspective view of an user operating a lawn trimmer using the improvement of this invention on the upward sloping ground of a hill.
Figure 4:
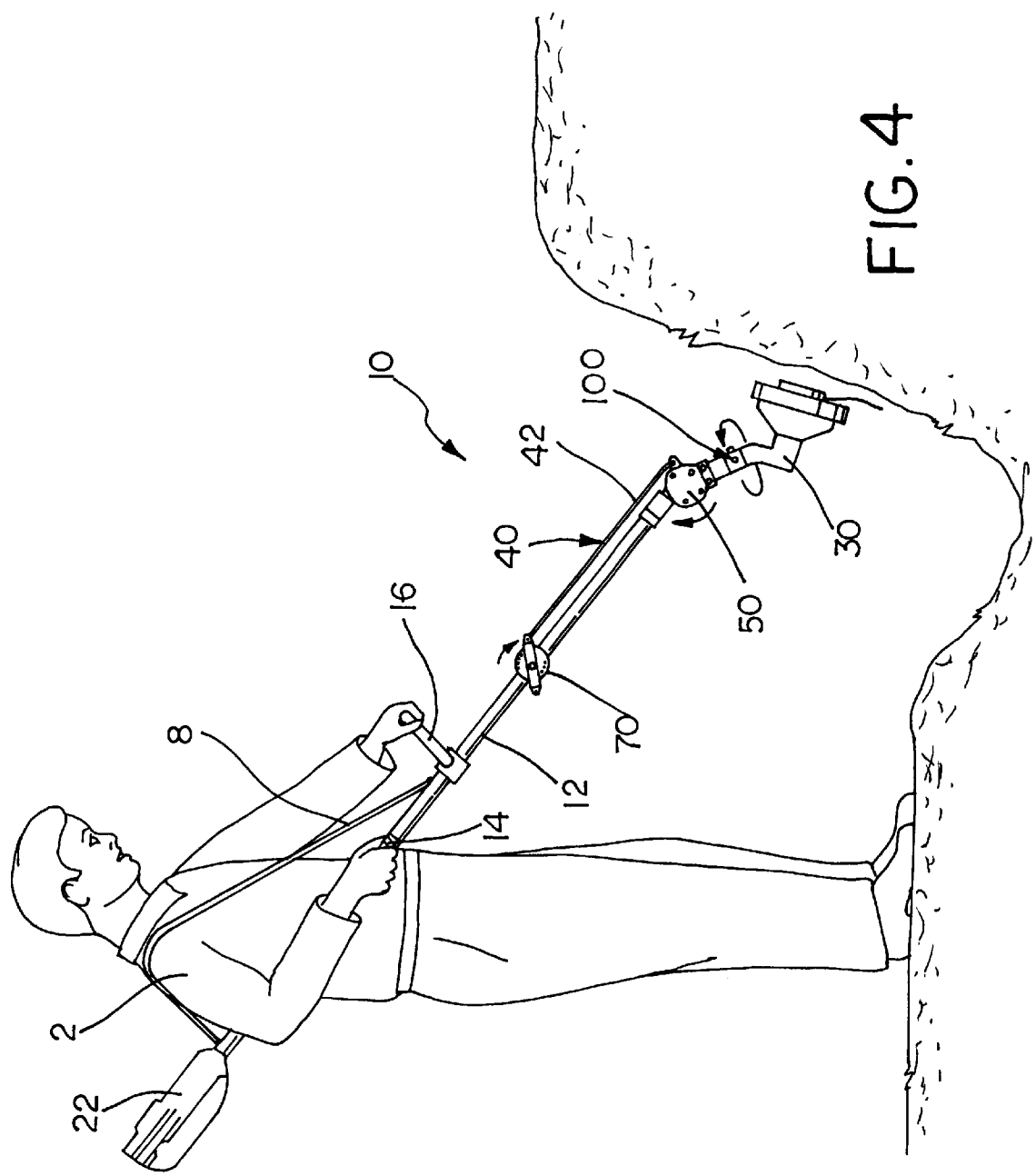
FIG. 4 is a perspective view of an user operating a lawn trimmer using the improvement of this invention on the downward sloping ground of a ravine.
Figure 5:
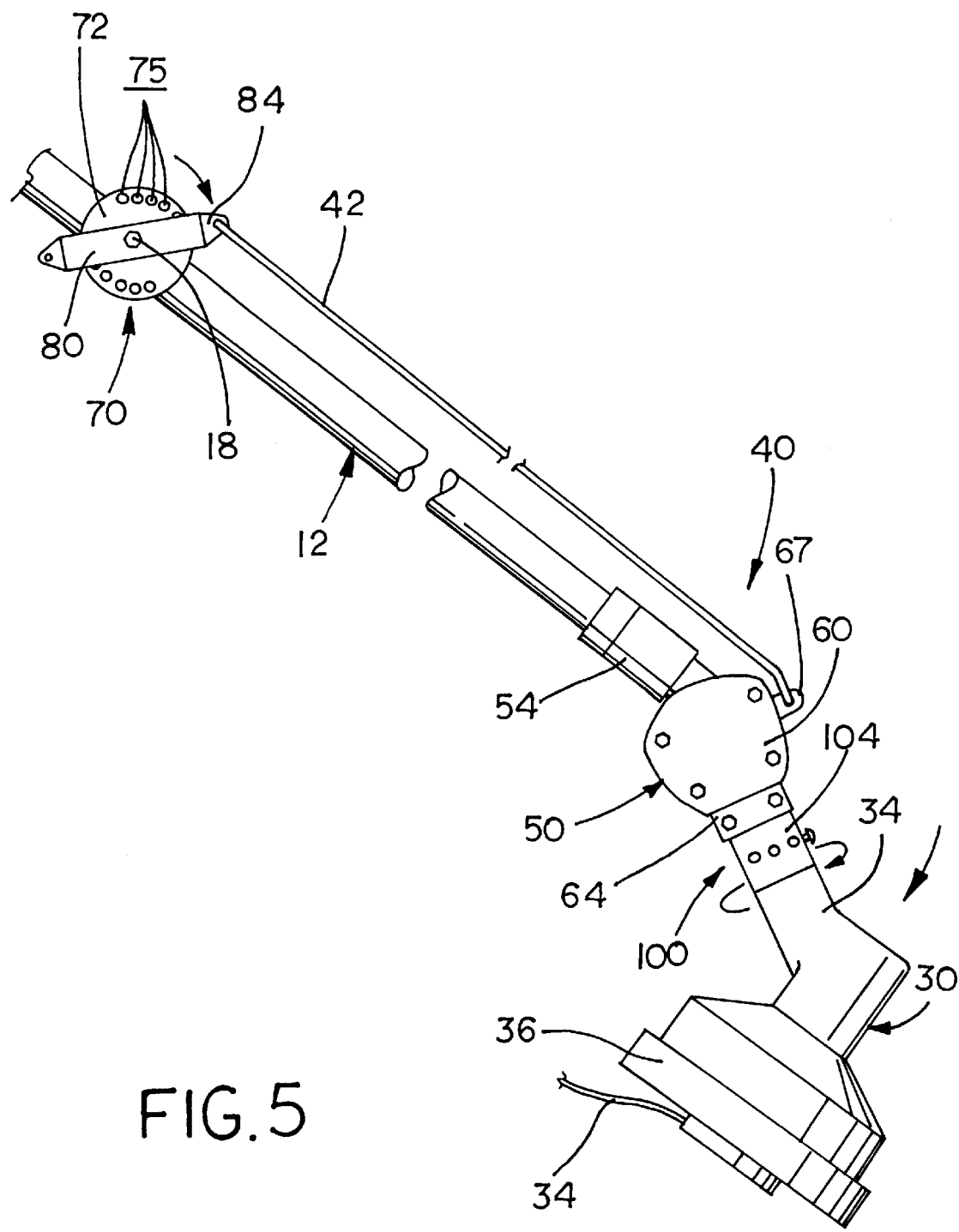
FIG. 5 is a side view of the lower portion of the trimmer of this invention showing the trimmer head in the downward most position.
Figure 6:
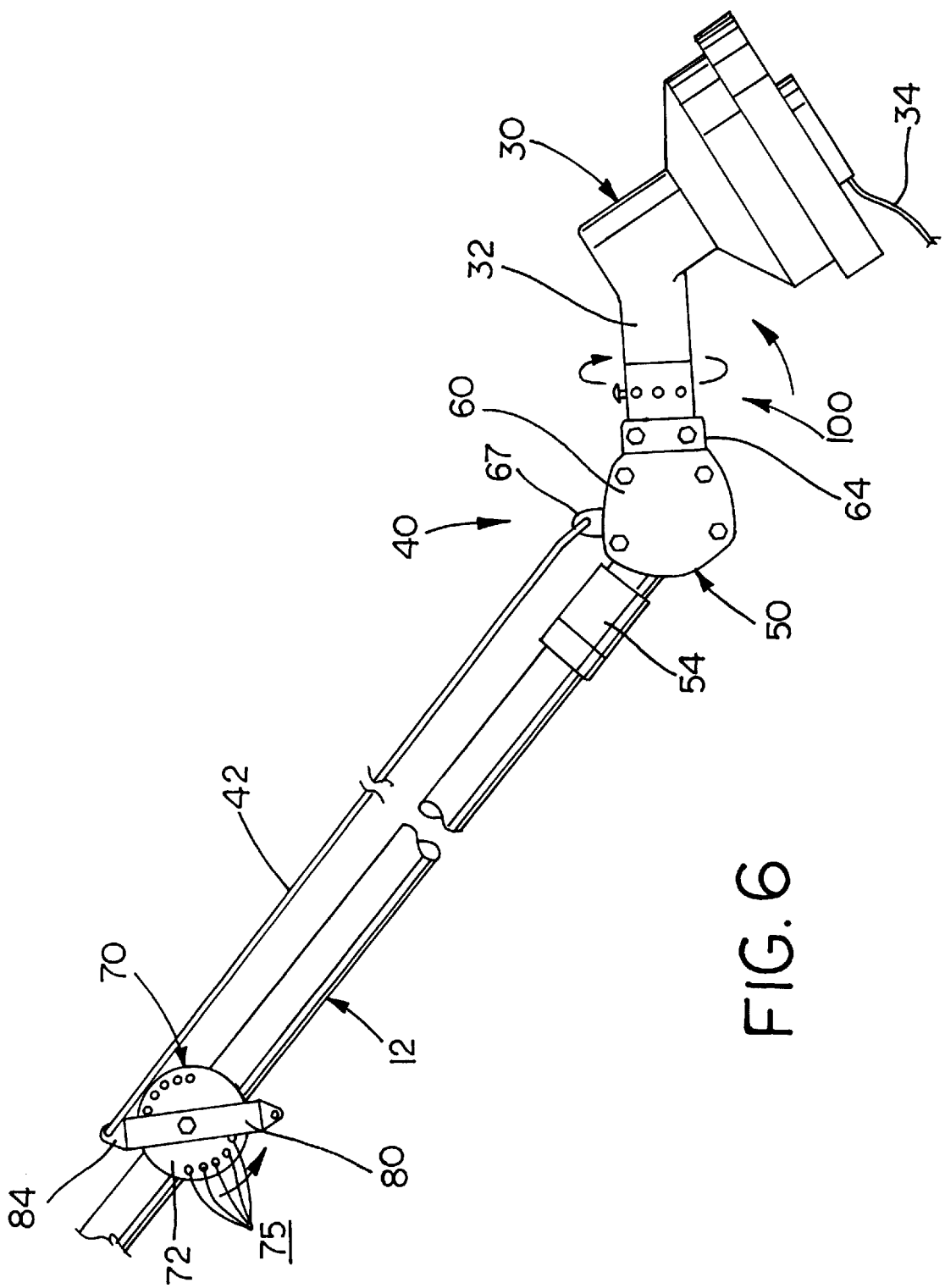
FIG. 6 is a side view of the lower portion of the trimmer of this invention showing the trimmer head in the upper most position.
Figure 11:
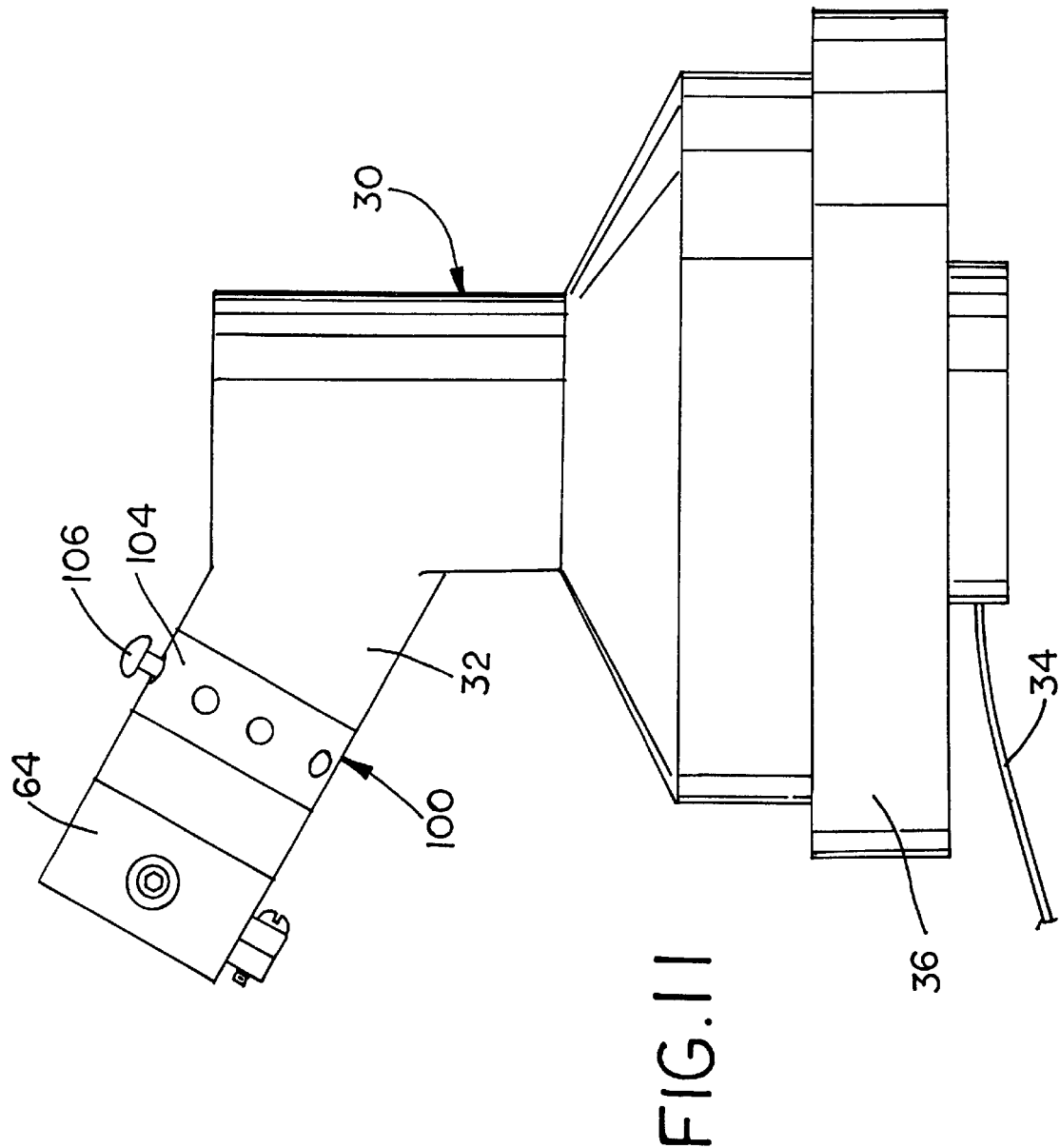
FIG. 11 is a side view of the trimmer head and adjustable head rotation assembly.

FIGS. 1–4 show an operator 2 working trimmer 10 over a variety of terrain 4. FIGS. 1–3 illustrate the operation of the trimmer head pivot adjustment 40 and FIG. 4 illustrates the operation of the trimmer head swivel adjustment 100. FIG. 1 shows operator 2 working trimmer 10 over level terrain with the pivot adjustment 40 in its central position. In this central position, selector handle 80 is positioned so that buttons 98 are aligned in the center most adjustment bores 75, which positions the upper and lower joint housings 52, 60 so that the upper and lower segments of drive shaft 24, 26 are axially aligned. FIG. 2 shows operator 2 working trimmer 10 over an upward sloping terrain with the pivot adjustment 40 in its most raised position. In its most raised position (also illustrated in FIG. 6), selection handle 80 is rotated to pull connecting rod 42 toward the operator, which pivots lower joint housing 60 and lifts the trimmer's cutting plane upward. FIG. 3 shows operator 2 working trimmer 10 over a downward sloping terrain with the pivot adjustment 40 in its most lowered position. In its most lowered position (also illustrated in FIG. 5), selection handle 80 is rotated to push connecting rod 42 away from the operator, which pivots lower joint housing 60 and lowers the trimmer's cutting plane downward. FIG. 4 shows operator 2 working trimmer 10 over an extremely upward sloping terrain with the pivot adjustment in its lower most position and the swivel adjustment adjusted to rotate the trimmer head 180°. In this adjustment position, instead of pivoting the cutting plane downward, the 180° rotation of the trimmer head swivel adjustment actually positions the cutting plane upward to its most extreme angular orientation.

Advantages and Features

From the foregoing, it will be appreciated that the two adjustment mechanisms, pivot adjustment 40 and swivel adjustment 100, work independently to allow the attitude and orientation of the cutting plane of the trimmer head to be adjusted about two different axis in relation to the boom arm between several discrete angular positions. Consequently, the two adjustment mechanisms allow an operator to manually change the attitude and orientation of the trimmer's cutting plane to conform to the slope and contour of the terrain without the operator altering the natural balanced operating position of the trimmer or his body posture and while maintaining the natural balanced orientation of the boom arm with respect to the operator and not the terrain being worked. This enables the lawn and brush trimmer to be quickly and readily adjusted by a user for operation on terrains of different slopes and contours. In addition, the adjustment mechanisms do not substantially alter the weight or balance of the trimmer and thereby do not effect the physical manipulation of the trimmer during operation. Since the cutting plane can be adjusted to conform to the contour and slope of any terrain, an operator can work the trimmer over any terrain while the boom arm remains in its natural and optimally balanced angular orientation.

An important feature of the present invention is that the trimmer head pivot adjustment 40 enables the trimmer head to pivot about an axis perpendicular to the longitudinal axis of the boom arm between several selectable positions. Another important feature of this invention is that the trimmer head swivel adjustment 100 enables the trimmer head to rotate axially 360° about the longitudinal axis of the trimmer head's neck and to be locked into several discrete positions. Another important feature of this invention is that both adjustment mechanisms enable selectable angular adjustments to the trimmer head while allowing the drive shaft to transfer rotational movement from the motor to the cutting components. While these features are provided by specific mechanical constructions described herein and illustrated in the figures, the teachings of this invention are not limited to any particular mechanical constructions for providing these functions. For example, the teachings of this invention are not limited to the use of a universal joint for providing the coaxial transmission of rotational movement of the drive shaft nor are they limited to any particular mechanical construction of the joint housing. A flexible coupling shaft can be incorporated to provide the same function as the universal joint, and the articulated joint housing can take numerous mechanical forms. The selection and locking functions of the pivot selection assembly may use a linearly sliding component rather than a rotating selector handle and may employ any suitable locking mechanism without limiting the scope of this invention. Any suitable mechanical construction may be employed to provide the concentric rotation and locking of the trimmer head. It is understood that the above description does not limit the invention to the details given, but may be modified within the scope of the following claims.

I claim:

1. An improvement in a portable lawn and brush trimmer, which includes an elongated tubular boom arm having a proximal end and a distal end, a trimmer head mounted to the distal end of the boom arm, a rotating cutting means extending from the trimmer head, a motor means mounted to the proximal end of the boom arm, and a drive shaft rotatably disposed within the boom arm between the motor means and the trimmer head for transferring rotational motion from the motor means to the cutting means, the improvement comprising:

the drive shaft includes a first segment connected to the motor means and a second segment connected to the trimmer head;

pivot means mounted to the boom arm and the trimmer head for pivoting the trimmer head angularly with respect to the boom arm;

shaft coupling means disposed within the pivot means and operatively coupled to the first segment and the second segment for allowing the first segment and the second segment limited angular movement with respect to each other while transmitting rotary movement between the first segment and the second segment;

pivot positioning means mounted to the boom arm and connected to the pivot means for selectively securing the trimmer head between a plurality of discrete pivotal adjustment positions; and swivel means mounted to the pivot means and the trimmer head for rotating the trimmer head axially about the axis of the second segment between an additional plurality of adjustment positions to adjust the orientation of the cutting means.

2. The improvement of claim 1 wherein the swivel means head in one of the plurality of discrete radial adjustment positions. includes a first collar part formed in one of the pivot means and the trimmer heand and a second collar part formed in the other of the pivot means and the trimmer head, the first colalr part rotatbably retained within the second collar part for rotation about a concentric longitudial axis.

3. The improvement of claim 2 wherein the first collar part having a plurality of radial bores formed therein, the second collar part including an manually extensible button insertable into any one of the plurality of radial boxes of the first collar part to secure the first collar part within the second collar part, thereby securing the trimmer head in one of the plurality of discrete radial adjustment positions.

4. The improvement of claim 1 wherein the pivot means includes a joint housing having a first housing part connected to one of the boom arm and the trimmer head and a second housing part connected to the other of the boom arm and the trimmer head, the first housing part being pivotally disposed within the second housing part for angular movement therein and defining a chamber for enclosing the shaft coupling means therein.

5. The improvement of claim 4 wherein the pivot positioning means includes a selector part rotatably mounted to the boom arm for manual rotational movement about a plane parallel to the boom arm between a plurality of selectable angular positions with respect to the boom arm, means for locking the selector part in one of the plurality of selectable angular positions, and an elongated rod part connecting the selector part to the pivot means.

6. The improvement of claim 5 wherein the means for locking includes a planar selector plate mounted to the boom arm having a plurality of adjustment bores therein, the selector part abutting the selector plate and including an extensible button insertable into any one of the plurality of adjustment bores to secure the selector part against the selector plate.

7. A lawn and brush trimmer for cutting foliage comprising:

an elongated tubular boom arm;

a trimmer head mounted to the distal end of the boom arm and having a rotating cutting means;

motor means mounted to the proximal end of the boom arm;

an elongated drive shaft rotatably disposed longitudinally within the boom arm for transferring rotational motion from the motor means to the cutting means, the drive shaft having a first segment connected to the motor means and a second segment connected to the trimmer head;

pivot means mounted to the boom arm and trimmer head for pivoting the trimmer head angularly with respect to the boom arm;

shaft coupling means disposed within the pivot means and operatively coupled to the first segment and the second segment for allowing the first segment and the second segment limited angular movement with respect to each other while transmitting rotary movement between the first segment and second segment;

pivot positioning means mounted to the boom arm and connected to the pivot means for selectively securing the trimmer head between a plurality of discrete pivotal adjustment positions to selectively change the orientation of the cutting means with respect to the boom arm, whereby the orientation of the cutting plane of the trimmer head with respect to the longitudinal axis of the boom arm can be selectively changed to permit the trimmer to be operated over un-level terrain while maintaining the natural balanced attitude of the trimmer with respect to the operator; and swivel means mounted to the pivot means and the trimmer head for rotating the trimmer head axially about the second segment for selectably positioning the trimmer head between a plurality of discrete radial adjustment positions about the second segment.

8. The trimmer of claim 7 wherein the swivel means includes a first collar part formed in one of the pivot means and the trimmer head and a second collar part formed in the other of the pivot means and the trimmer head, the first collar part rotatably retained within the second collar part for rotation about a concentric longitudinal axis.

9. The trimmer of claim 8 wherein the first collar part having a plurality of radial bores formed therein, the second collar part including an manually extensible button insertable into any one of the plurality of radial bores of the first collar part to secure the first collar part within the second collar part, thereby securing the trimmer head in one of the plurality of discrete radial adjustment positions.

10. The trimmer of claim 7 wherein the pivot means includes a joint housing having a first housing part connected to one of the boom arm and the trimmer head and a second housing part connected to the other of the boom arm and the trimmer head, the first housing part being pivotally disposed within the second housing part for angular movement therein and defining a chamber for receiving the shaft coupling means therein.

11. The trimmer of claim 10 wherein pivot positioning means includes a selector part rotatably mounted to the boom arm for manual rotational movement about a plane parallel to the longitudinal axis of the boom arm between a plurality of selectable angular positions with respect to the boom arm, means for locking the selector part in one of the plurality of selectable angular positions, and an elongated rod part connecting the selector part to the pivot means.

12. The trimmer of claim 11 wherein the locking means includes a planar selector plate mounted to the boom arm having a plurality of adjustment bores therein, the selector part abutting the selector plate and including an extensible button insertable into any one of the plurality of adjustment bores to secure the selector part against the selector plate and prevent the movement of the selector part relative to the selector plate.

* * * * *